United States Patent [19]
Lattuada

[11] Patent Number: 4,593,650
[45] Date of Patent: Jun. 10, 1986

[54] ANIMAL CAGE AND METHOD
[75] Inventor: Charles P. Lattuada, Burlington, N.C.
[73] Assignee: Granite Technological Enterprises, Inc., Burlington, N.C.
[21] Appl. No.: 704,874
[22] Filed: Feb. 25, 1985
[51] Int. Cl.$^4$ ............................................... A01K 1/03
[52] U.S. Cl. ........................................ 119/15; 119/17
[58] Field of Search .......................... 119/15, 1, 17, 18
[56] References Cited
U.S. PATENT DOCUMENTS 3,464,388  9/1969  Stout ...................................... 119/15
3,537,428  11/1970  Montgomery ..................... 119/15 X
3,924,571  12/1975  Holman ................................. 119/15
4,480,587  11/1984  Sedlacek .............................. 119/15

Primary Examiner—Hugh R. Chamblee
Attorney, Agent, or Firm—B. B. Olive

[57] ABSTRACT

A conventional animal cage for housing experimental animals comprises a standard small animal shoe box with a filter bonnet modified with an auxiliary disposable sterile filter connected to a source of pressurized air so as to permit a forced circulation of air through the sterile filter and through an air filter sheet in the filter bonnet so as to permit only the exhausting of gases from the chamber.

3 Claims, 5 Drawing Figures

ANIMAL CAGE AND METHOD

DESCRIPTION

TECHNICAL FIELD

The invention relates to animal cages and more specifically to animal cages used in animal production or research in which containment of microbiological particles is significant.

BACKGROUND ART

Practical considerations in raising an experimental mouse colony are dealt with in an article entitled "A Flexible Barrier at Cage Level for Existing Colonies: Production and Maintenance of a Limited Stable Anaerobic Flora in a Closed Inbred Mouse Colony" by R. S. Sedlacek, R. P. Orcutt, H. D. Suit and E. F. Rose, published in Recent Advances in Germfree Research, pp. 65–69, Tokai University Press, 1981. The mentioned article describes a standard mouse shoe box made of transparent plastic, e.g., polycarbonate, and also describes what is referred to as a filter bonnet for the shoe box or cage. The bottom edges of the filter bonnet rests on the top edges of the side walls of the mouse box. The open top of the filter bonnet is fitted with a replaceable filter sheet containing a Remay 20-24 filter medium protected by a perforated aluminum plate. Since the filter bonnet is designed to fit tightly over the animal cage, the system acts as a static system and prevents particulate material from entering the cage. This type of cage and caging system has been made and sold as the Micro-Isolator System by Lab Products, Inc., 255 West Spring Valley Avenue, Maywood, N.J. 07607 and the trade literature of this company describes the cage in more detail.

While the mentioned prior art caging system has been shown to be effective in maintaining animals for up to thirty months with a constant microbial flora, i.e., free of exogenous microbial contamination, the system has a major disadvantage in that air exchange is predicated upon gradient diffusion. Gases of greater concentration diffuse through the filter in the direction of lesser concentration. Thus, under these conditions $CO_2$ and $NH_3$ from the animals will accumulate and will only diffuse slowly and outwardly from the cage and $O_2$ and $N$ will diffuse slowly into the cage. As a result of this disadvantage, the population within the cage must be kept relatively low and/or the cage must be changed every three to four days.

With the foregoing background, the present invention has as its object providing a still-further improved cage and caging system and method which eliminates the disadvantage of the air exchange being predicated solely upon gradient diffusion. The present invention also has as an object providing an improved cage, caging system and method which allows the static system to resume operation when removing the invention cage for operations such as animal manipulation and/or cage change such as would be carried out in a laminar flow cabinet.

DISCLOSURE OF INVENTION

The improved animal cage of the invention is based upon modifying the described prior art Micro-Isolator-type of cage by adding a disposable sterile filter to one of the walls of the filter bonnet and in normal use connecting this auxiliary filter to a source of pressurized air so as to convert the conventional static system of the prior art into a normally dynamic system in which all gases tend to diffuse through the filter in the top of the cage. The invention modification maintains the same high degree of integrity in the system, allows the population to be maintained at levels consistent with the "Guide For the Care and Use of Laboratory Animals", (DHEW Publication 80-23), keeps the bedding dry, maintains a humidity equal to the ambient humidity maintained in the room in which the cages are housed and facilitates an effective interchange of gases. When it is necessary to remove the cage of the invention from the system for animal manipulation and/or cage change or to replace the auxiliary filter of the invention, the invention cage resorts to a static system without a pressurized flow of air and thus maintains the integrity of the system as originally designed.

BEST MODE FOR CARRYING OUT THE INVENTION

Figure 1:
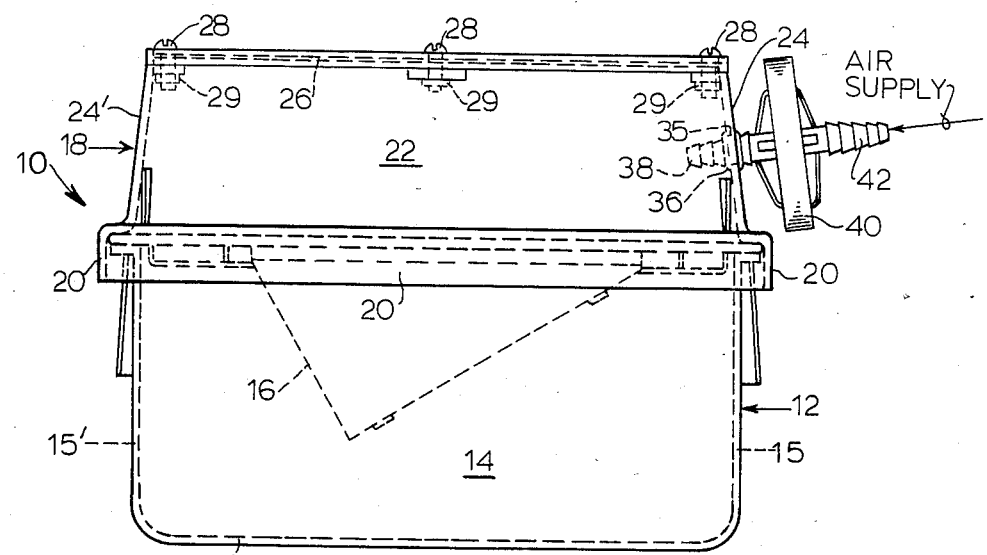
FIG. 1 is a side elevation view of the invention cage.

The animal cage 10 of the invention in the described embodiment is illustrated as being formed of polycarbonate or other suitable rigid, transparent plastic material. Cage 10, in the illustrated embodiment, comprises a standard small animal shoe box 12 and a filter bonnet 18. Shoe box 12 of conventional construction is formed as an open top tray and includes a bottom wall 13 for receiving the animal bedding and upstanding opposed sidewalls 14, 14' and opposed end walls 15, 15' for confining the animals. A standard, removable, stainless steel wire bar cover 16 nests within the upper edges of box 12. The animals are confined below bar cover 16 on which solid and liquid foods for the animals are normally supported. Shoe box 12 and bar cover 16 are otherwise of conventional construction.

Filter bonnet 18 is loosely supported on box 12 and has overlapping outwardly and downwardly turned edge portions 20 which fit on the upper top edges of box 12 to provide a snug, gas-sealed fit between box 12 and filter bonnet 18. The side walls 22, 22' and end walls 24, 24' of filter bonnet 18 terminate in an open top on which is supported a removable filter sheet 26 held by a perforated aluminum sheet 30 secured by screws 28 and nuts 29. Filter sheet 26 is typically a ReeMay 20-24 filter medium.

What has thus far been described with respect both to box 12 and filter bonnet 18 represents a conventional and known type of animal cage which operates solely as a static system. That is, there is no positive difference in pressure between the inside and outside of the cage. Thus, air exchange is predicated solely upon gradient diffusion which means that gases of greater concentration diffuse through the filter 26 in the direction of lesser concentration. Under these conditions where cage 10 is fitted only with the conventional filter 26, $CO_2$ and $NH_3$, if present, will accumulate and will slowly diffuse outwardly from the cage 10 whereas $O_2$ and N will slowly diffuse into the cage. The more desired conditions would be to have none of the mentioned gases collect in the cage to maintain optimal conditions within the cage.

The cage construction, system, and method of the invention is designed to retain all of the advantages of the existing cage construction and static system while eliminating the mentioned disadvantage. In this regard, the previously-described filter bonnet 18 is modified by forming a hole 35 in end wall 24 for receiving an O-ring 36 surrounding a stepped-type tubular fitting 38. Fitting 38 extends from one side of a conventional disposable sterile filter 40 having on the opposite side another stepped-type tubular fitting 42 connected to a source of pressurized air. In one embodiment, filter 40 comprised a composite, disposable filter/filter support unit with a 0.22 micron air filter membrane which was found suitable and was replaced each time the cage was cleaned. It can be seen that the only modification required for modifying filter bonnet 18 is to form the hole 35 and install O-ring 36 for receiving the sterile filter 40. Beyond this, once the filter 40 has been connected to an appropriate source of pressurized air the modified system of the invention is made operable.

Preferably, the airflow is at a rate selected to accomplish 10 to 15 air changes per hour within the cage. When it is necessary to move the cage to change the animals to a clear, sterile cage or for any other manipulation or to replace either the filter 26 or the filter 40, the supply of pressurized air from the source can be disconnected whereupon cage 10 reverts to a static system and gradient diffusion preparatory to manipulations or other operations being performed by trained, suitably-garbed personnel working in a laminar flow cabinet.

Figure 5:
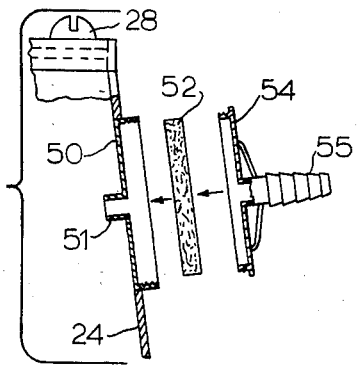
FIG. 5 is a fragmentary, exploded, partial section detail view illustrating an alternative auxiliary filter support.
Figure 2:
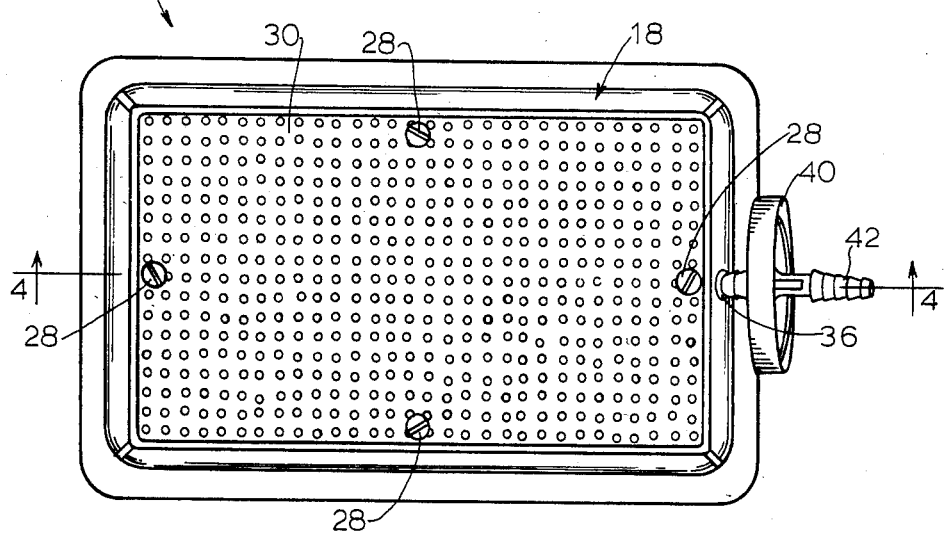
FIG. 2 is a top plan view of the invention cage.
Figure 3:
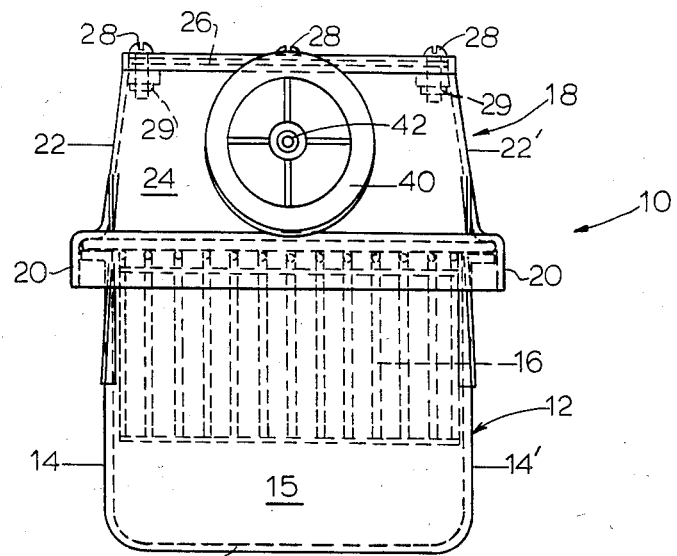
FIG. 3 is a right end view of the invention cage.
Figure 4:
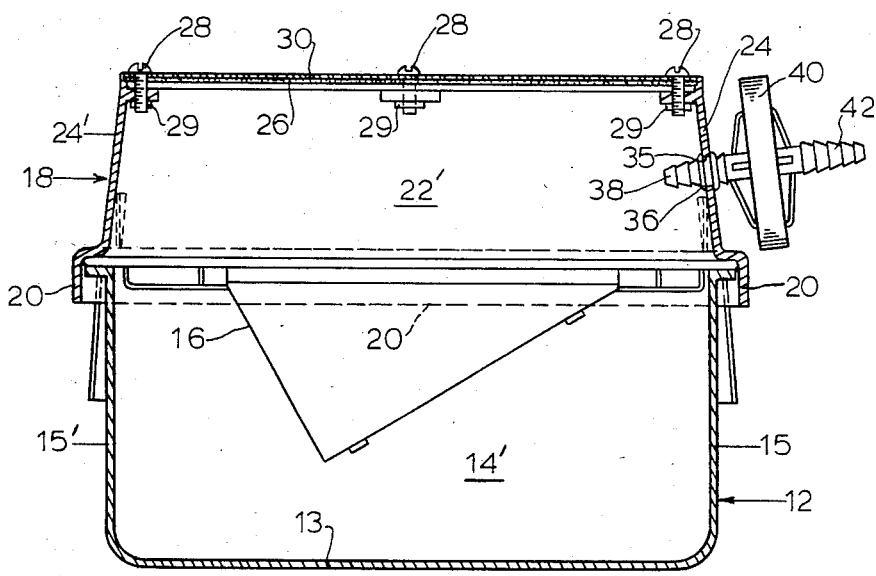
FIG. 4 is a section view taken generally along line 4—4 of FIG. 2 with the rack and auxiliary filter of the invention shown not sectioned for illustrative purposes.

FIG. 5 illustrates in an alternative embodiment a modified auxiliary filter arrangement in which a female filter support member 50 with outlet 51 comprises an integral molded portion of the end wall 24. The replaceable and disposable filter membrane 52 loosely mounts in filter support member 50 and is held by the threaded male filter support member 54 when in use. To replace filter membrane 52, male filter support member 54 is unscrewed from the female support member 50 to expose the dirty membrane 52 for removal and replacement. The air supply is attached to inlet 55.

In summary, the invention provides an improved cage construction, system and method which enables the animal population to be maintained at known desired microbiological-free levels with substantially dry bedding, a humidity equal to the ambient humidity maintained in the room in which the cages are housed and a desirable interchange of gases. Thus, the invention will allow laboratory animals to be maintained as S.P.F. (specific-pathogen free) and/or defined microbial flora without any of the disadvantages associated with the prior art cage, system and method.

What is claimed is:

1. A portable environmental chamber for caging mice or other small experimental animals, comprising:
    (a) a bottom section formed of transparent plastic material as an open top tray with a rectangular bottom wall for receiving animal bedding material and four side walls extending vertically upward therefrom and terminating in a top peripheral edge and including a bar cover supported by and within said bottom section above said bottom wall;
    (b) a top section formed of transparent plastic materials as an open bottom tray with a perforate rectangular top wall and four side walls extending downwardly and depending from said top wall and having an outwardly flared formed peripheral bottom edge loosely resting upon said bottom section side wall top peripheral edge in substantially air-sealed relation;
    (c) a rectangular disposable filter sheet fitted and removably secured to said top section perforate top wall for filtering both pressurized air and gases generated within said chamber and passing outwardly therefrom;
    (d) an auxiliary filter support mounted in a selected said top section side wall and having an inlet external of said selected side wall and an outlet internal of said selected side wall;
    (e) an auxiliary sterile filter loosely and removably supported in said auxiliary filter support between said inlet and outlet enabling air forced therethrough into said chamber to be filtered; and
    (f) a source of pressurized air adapted for being removably connected to said auxiliary filter inlet, whereby when said top section is placed on said bottom section with said top section peripheral edge in said sealed relation with said bottom section peripheral edge and said pressurized air source is disconnected, said air filter sheet provides static filtration of and permits gases generated within said chamber to diffuse outwardly through said filter sheet to leave said chamber and external unpressurized air to diffuse through said filter sheet into said chamber and when said pressurized air source is connected, a forced circulation is established above said bottom section and through said sterile filter and air filter sheet permitting only the exhausting of air and gases from said chamber and simultaneously drying of said bedding.

2. A portable environmental chamber as claimed in claim 1 wherein at least a portion of said auxiliary filter support comprises an integral portion of said selected top section side wall and said auxiliary filter comprises a disposable filter removably housed therein.

3. A portable environmental chamber as claimed in claim 1 wherein said filter support and auxiliary filter comprise a disposable composite unit removably mounted in said selected side wall.

* * * * *